United States Patent
Lepretre

(10) Patent No.: US 11,384,695 B2
(45) Date of Patent: Jul. 12, 2022

(54) ASSEMBLY FOR AIRCRAFT TURBINE ENGINE COMPRISING AN IMPROVED SYSTEM FOR LUBRICATING A FAN DRIVE REDUCTION GEAR IN CASE OF AUTOROTATION OF THE FAN

(71) Applicant: SAFRAN AIRCRAFT ENGINES, Paris (FR)

(72) Inventor: Jean-Baptiste Etienne Bernard Lepretre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 46 days.

(21) Appl. No.: 16/972,797

(22) PCT Filed: Jun. 12, 2019

(86) PCT No.: PCT/FR2019/051417
§ 371 (c)(1),
(2) Date: Dec. 7, 2020

(87) PCT Pub. No.: WO2019/243710
PCT Pub. Date: Dec. 26, 2019

(65) Prior Publication Data
US 2021/0246834 A1 Aug. 12, 2021

(30) Foreign Application Priority Data

Jun. 18, 2018 (FR) ........................................ 1855345

(51) Int. Cl.
*F02C 7/36* (2006.01)
*B64D 27/16* (2006.01)
(Continued)

(52) U.S. Cl.
CPC ................ *F02C 7/36* (2013.01); *B64D 27/16* (2013.01); *F02C 7/06* (2013.01); *F16H 57/046* (2013.01);
(Continued)

(58) Field of Classification Search
CPC .... F02C 7/06; F02C 7/36; F01D 25/18; F05D 2260/40311; F05D 2220/323;
(Continued)

(56) References Cited

U.S. PATENT DOCUMENTS 4,169,519 A * 10/1979 Hirt ..................... F16H 57/0447
184/6.12
2011/0299974 A1 12/2011 Gauthier et al.
(Continued)

FOREIGN PATENT DOCUMENTS

| EP | 2 538 055 A2 | 12/2012 |
|---|---|---|
| EP | 3 109 412 A1 | 12/2016 |

(Continued)

OTHER PUBLICATIONS

William Sheridan, Michael McCune, and Michael Winter, "Geared TurbofanTM Engine: Driven by Innovation," Encyclopedia of Aerospace Engineering, Online © 2010 John Wiley & Sons, Ltd. (Year: 2010).*

(Continued)

*Primary Examiner* — Todd E Manahan
*Assistant Examiner* — David P. Olynick
(74) *Attorney, Agent, or Firm* — Oblon, McClelland, Maier & Neustadt, L.L.P.

(57) ABSTRACT

An assembly includes: a fan drive reducing gear of an aircraft turbine engine, and a lubrication system including: a housing enclosing the reducing gear; a device for spraying lubricant onto the reducing gear; a lubricant supply pipe intended to convey the lubricant towards the spraying (Continued)

device; a lubricant recovery pipe communicating with a bottom of the housing; a controlled valve equipping the recovery pipe; and a lubricant overflow discharge pipe connected to an overflow outlet of the bottom of the housing situated above a horizontal level of a bottom point of a gearing of the reducing gear, and to the recovery pipe, downstream from the valve.

9 Claims, 3 Drawing Sheets

(51) Int. Cl.
*F02C 7/06* (2006.01)
*F16H 57/04* (2010.01)
(52) U.S. Cl.
CPC ..... *F16H 57/0435* (2013.01); *F16H 57/0447* (2013.01); *F16H 57/0486* (2013.01); *F05D 2220/323* (2013.01); *F05D 2260/40311* (2013.01); *F05D 2260/98* (2013.01); *F16H 57/0436* (2013.01)
(58) Field of Classification Search
CPC ...... F05D 2260/98; F01M 9/06; B64D 27/16; F16H 57/04; F16H 57/042; F16H 57/0421; F16H 57/0435; F16H 57/0446; F16H 57/0447; F16H 57/0486; F16H 57/0424; F16H 57/435; F16H 57/442; F16H 57/456

See application file for complete search history.

(56) References Cited

U.S. PATENT DOCUMENTS

| 2012/0324899 | A1 | 12/2012 | DiBenedetto et al. |
| 2016/0376984 | A1 | 12/2016 | Sheridan |
| 2019/0264800 | A1* | 8/2019 | Fisher ..................... F02C 7/06 |

FOREIGN PATENT DOCUMENTS

| FR | 2 987 402 A1 | 8/2013 |
| FR | 2 987 417 A1 | 8/2013 |
| FR | 3 028 887 A1 | 5/2016 |
| WO | WO 2010/092263 A1 | 8/2010 |

OTHER PUBLICATIONS

International Search Report dated Sep. 23, 2019 in PCT/FR2019/051417 filed on Jun. 12, 2019 (2 pages).
Preliminary French Search Report dated Feb. 20, 2019 issued in FR 1855345 filed on Jun. 18, 2018 (1 page).

* cited by examiner

ASSEMBLY FOR AIRCRAFT TURBINE ENGINE COMPRISING AN IMPROVED SYSTEM FOR LUBRICATING A FAN DRIVE REDUCTION GEAR IN CASE OF AUTOROTATION OF THE FAN

TECHNICAL FIELD

The present invention relates to the field of aircraft turbine engines, and more precisely to turbine engines comprising a fan driven by a reducing gear, which is known for example from document FR 2 987 402 A1.

The invention relates in particular to managing the lubrication of the reducing gear, in case of autorotation of the fan.

PRIOR ART

In aircraft turbine engines comprising a fan driven by a reducing gear, the latter is generally arranged in a lubricated casing through which lubricant supplied by a pump circulates. This pump is driven mechanically by a shaft of the turbine engine, for example the high-pressure shaft.

If the turbine engine shuts down during the flight, the fan is no longer driven by the reducing gear, but it continues to rotate as a result of the air passing through. In these conditions, the fan is said to be in autorotation or also "windmilling". These conditions can also be encountered on the ground when the turbine engine is shut down.

Even if the autorotation speeds of the fan remain relatively low, particularly when the aircraft is on the ground, there is still a need to lubricate the reducing gear driven by said fan. The lubrication of the casing enclosing the reducing gear may however no longer be ensured by the pump, as the high-pressure shaft does not rotate sufficiently rapidly to drive said pump.

The existing solutions for ensuring the lubrication of the reducing gear in these conditions generally install a secondary oil circuit with an auxiliary reservoir and an associated auxiliary pump. A secondary oil circuit generally has disadvantages in terms of mass, bulk, complexity, cost and reliability.

There is thus a need to optimise existing solutions, in order to ensure the management of the lubrication of the reducing gear in case of autorotation of the fan.

PRESENTATION OF THE INVENTION

In order to address this need at least partially, the subject matter of the invention is firstly an assembly comprising a fan drive reducing gear for a turbine engine of an aircraft, as well as a lubrication system comprising:
  a casing enclosing the reducing gear;
  means for projecting lubricant onto the reducing gear;
  an intake pipe for lubricant intended to conduct the lubricant towards the projection means;
  a lubricant recovery line communicating with a bottom of the casing.

According to the invention, the lubrication system also comprises an actuated valve fitted to the lubricant recovery line, as well as a lubricant overflow discharge line which is connected on the one hand to an overflow outlet at the bottom of the casing located above the horizontal level of a low point of a gearset of the reducing gear, and on the other hand to the lubricant recovery line, downstream of the actuated valve.

The invention thus makes it possible to ensure in a simple, reliable and effective manner the lubrication of the reducing gear in case of autorotation of the fan. Indeed, following the closure of the control valve, the low flow of lubricant which remains means that the bottom of the casing is filled until at least a portion of the gearset of the reducing gear is immersed.

In particular, the invention proves advantageous in that it does not require the integration of a pump or an additional reservoir to ensure the lubrication of the reducing gear in conditions of autorotation.

The invention also has at least one of the following optional features, taken either individually or in combination.

The valve is controlled by the pressure of lubricant circulating in the lubricant intake pipe, such that the lower the lubricant pressure, the greater the tendency of the valve to close. The control of the valve is thus set so that that the valve closes completely when the pressure of lubricant is lower than a predetermined threshold. This preferred way of controlling the valve provides even greater reliability. However, any other method of control can be envisaged for controlling the valve, such as a simple electric control capable of causing the closure of the valve when the fan is in a state of autorotation.

For example, the actuated valve is a slide valve, although other types of valve are possible without departing from the scope of the invention. Preferably, the slide valve is connected to a moving part subjected to the pressure of the lubricant circulating in the lubricant intake pipe, this moving part acting against the action of a preloaded spring as a function of a threshold lubricant pressure below which the valve is set to close completely.

The drive reducing gear includes a planetary gear set comprising an inner planetary gear, an outer ring gear, as well as an annular row of satellites arranged between the inner planetary gear and the outer ring gear.

In order to do this, the overflow outlet at the bottom of the casing is located preferably below the horizontal level of the inner planetary gear, and even more preferably in an imaginary horizontal plane traversing the annular row of satellites. This makes it possible to prevent the casing filling up completely and at the same ensures that the assembly of the gearset is lubricated, in particular by means of the rotation of the outer ring gear which is generally the output element of the gearset coupled mechanically to the fan.

The subject matter of the invention is also an aircraft turbine engine of comprising such an assembly, the turbine engine comprising a fan driven by the reducing gear of this assembly.

Said turbine engine is preferably a dual-flow and dual-body turbojet engine.

Preferably, the lubrication system comprises a feed pump configured to supply the lubricant intake pipe with lubricant, and the turbine engine comprises an engine shaft, preferably a high-pressure shaft, mechanically driving the feed pump.

Lastly, the subject matter of the invention is a method for controlling the assembly described above, said method being such that in case of the autorotation of the fan, it comprises a step of closing the actuated valve fitted to the lubricant recovery line, so that the bottom of the casing is filled with lubricant up to the overflow outlet.

Other advantages and features of the invention are given in the non-limiting detailed description given below.

BRIEF DESCRIPTION OF THE DRAWINGS

This description is given with reference to the accompanying drawings in which.

DETAILED DESCRIPTION OF PREFERRED EMBODIMENTS

Figure 1:
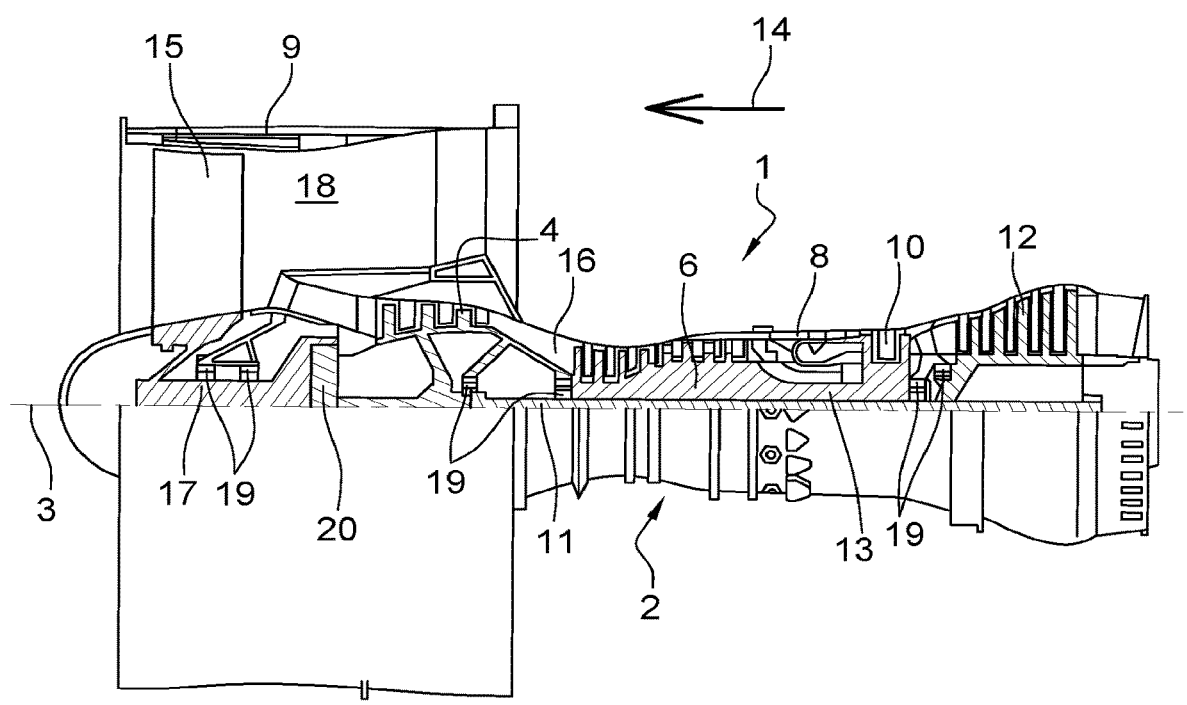
FIG. 1 shows a schematic view of the side of a turbojet engine according to the invention.

With reference to FIG. 1, a dual-flow and dual-body turbojet engine 1 is shown. The turbojet engine 1 includes in a typical manner a gas generator 2 on both sides of which a low-pressure generator 4 and a low-pressure turbine 12 are arranged. The gas generator 2 comprises a high-pressure compressor 6, a combustion chamber 8 and a high-pressure turbine 10. In the following, the terms "front" and "back" are considered in a direction 14 opposite the main flow direction of gases within the turbojet engine, this direction 14 being parallel to the longitudinal axis 3 of the turbojet engine.

The low-pressure generator 4 and the low-pressure turbine 12 form a low-pressure body, and are connected to one another by a low-pressure shaft 11 centred on the axis 3. Likewise, the high-pressure compressor 6 and the high-pressure turbine 10 form a high-pressure body, and are connected to one another by a high-pressure shaft 13 centred on the axis 3 and arranged around the low-pressure shaft 11. The shafts are supported by roller bearings 19, which are lubricated by being arranged in oil casings. The same applies to the fan hub 17, also supported by roller bearings 19.

The turbojet engine 1 also comprises, in front of the gas generator 2 and the low-pressure generator 4, a fan 15 which is here arranged directly to the rear of an air intake cone of the engine. The fan 15 is rotatable about the axis 3, and surrounded by a fan housing 9. Said fan is not driven directly by the low-pressure shaft 11, but is driven indirectly by said shaft via a reducing gear 20, which allows it to rotate at a lower speed. As detailed in the following, the reducing gear 20 is also housed in an oil casing to enable its lubrication.

Furthermore, the turbojet engine 1 defines a primary stream 16 designed to be traversed by a primary flow, as well as a secondary stream 18 designed to be traversed by a secondary flow located radially towards the outside relative to the primary flow.

Figure 2:
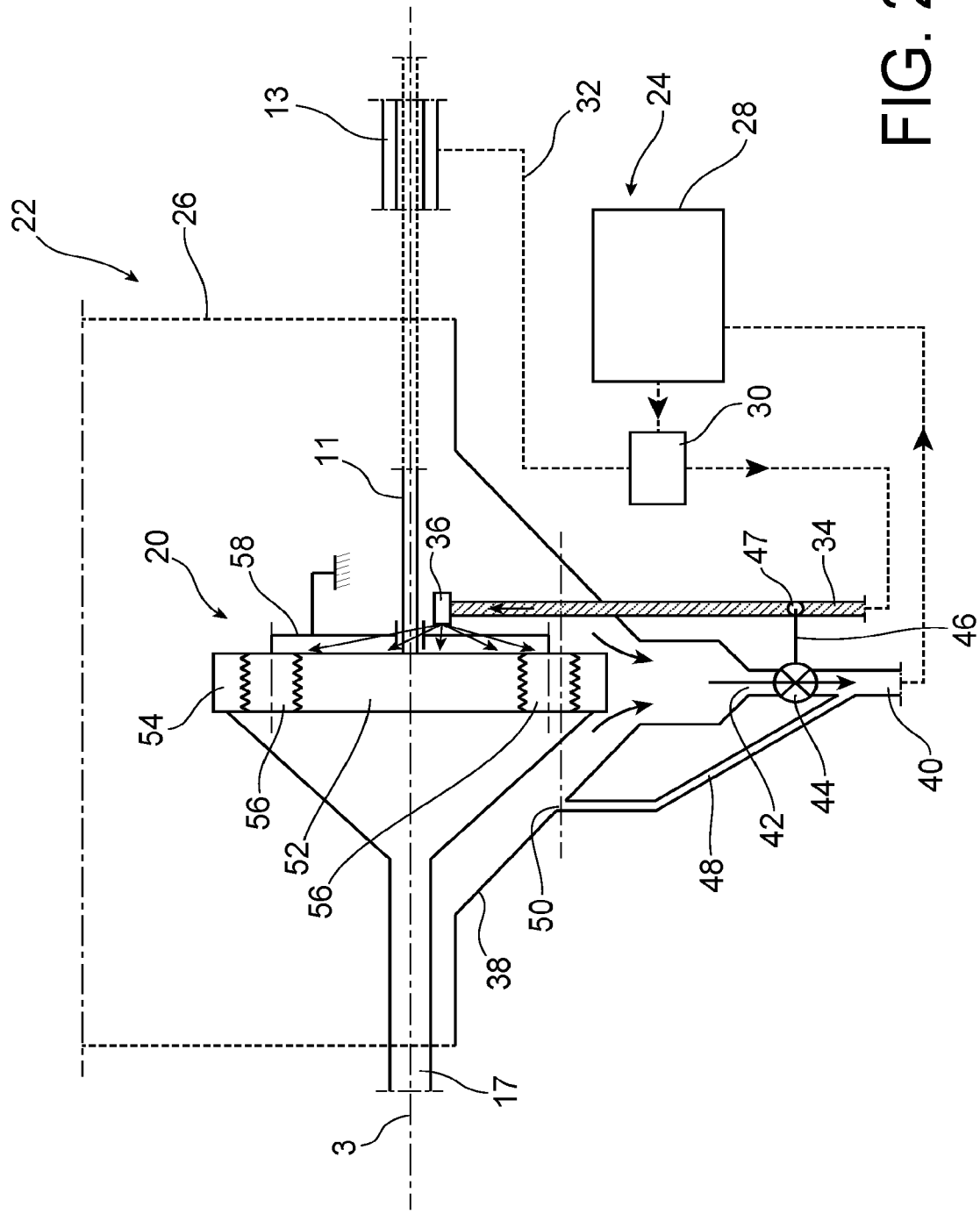
FIG. 2 shows a schematic view of the side of an assembly according to a preferred embodiment of the invention, this assembly being fitted to the turbojet engine of the preceding figure and shown in a state which is adopted during normal functioning conditions of the turbojet engine.

Now with reference to FIG. 2, a specific assembly 22 of the invention is shown, comprising in general terms the reducing gear 20 as well as a system 24 that enables its lubrication.

More precisely, the lubrication system 24 firstly comprises an oil casing 26 which encloses the reducing gear 20. It also comprises a lubricant reservoir 28, as well as a volume feed pump 30 (gear pump) which in the shown embodiment is driven mechanically by the rotation of the high-pressure shaft 13, via a transmission system illustrated by the dashed line 32. As an alternative, the volume feed pump 30 can be decoupled from the shaft 13 and driven in rotation by an electric motor so that its flow of lubricant can be adjusted by controlling the rotational speed of the pump by controlling the speed of the electric motor. The reservoir 28 and the pump 30 communicate with a lubricant intake pipe 34, which is thus supplied with lubricant from the reservoir 28, by means of the pump 30.

The lubricant intake pipe 34 thus has one end connected to the pump 30, as well as an opposite end housed in the casing 26, and communicating with lubricant projection means 36. These means can have the form of one or more spray nozzles, or similar means. They are configured to project lubricant over all or part of the gearset of the reducing gear 20.

The casing 26 has a bottom 38, in which a lower part of the reducing gear 20 is accommodated. A lubricant recovery line 40 communicates with a low point 42 of the bottom of the casing 38. It makes it possible to collect by gravity the lubricant which has been previously projected by the means 36 onto the reducing gear, and to redirect this lubricant towards the reservoir 28.

The lubricant recovery line 40 is fitted with an actuated valve 44, which in normal conditions of functioning of the turbojet engine remains open to permit the evacuation of lubricant and avoid its accumulation at the bottom of the casing 38. It may consist for example of a slide valve, responding to the pressure of lubricant circulating in the lubricant intake pipe 34 in the direction of the casing 26. Indeed, this valve 44 can be configured such that the greater the lubricant pressure in the pipe 34, the greater the tendency of the valve 44 to remain open. Inversely, the lower the lubricant pressure, the greater the tendency of the valve to close to block the recovery line 40.

A mechanical or electrical coupling 46 can be provided between the valve 44 and a part 47 mounted in the pipe 34 or in a chamber communicating with the pipe 34, this part 47 responding to the pressure of the lubricant circulating in the latter. The part 47 comprises for example a mobile piston connected to a plug of the valve 44 by a mechanical coupling 46, this piston acting against the action of a preloaded spring according to the threshold lubricant pressure below which the valve is set to close completely. It is understood that the valve 44, the mechanical coupling 46 and the mobile part 47 can be grouped together in the same device. Alternatively, the part 47 can be formed by a gauge connected to the valve 44 by an electric coupling 46 to control the triggering of an actuator for closing the valve when the pressure measured by the gauge 47 falls below a predetermined threshold pressure.

The lubrication system 24 also comprises an overflow lubricant discharge line 48, of particular interest in case of the autorotation of the fan, as described below. The discharge line 48 is connected at one of its ends to an overflow outlet 50, provided through the bottom wall of the casing 38. At its opposite end, the discharge line 48 is connected to the recovery line 40, downstream of the actuated valve 44.

The reducing gear 20 is centred on the geometric axis 3 of the low-pressure shaft 11, which is also the geometric axis of the fan hub 17. It comprises a planetary gear set, which in the shown configuration is typically provided with an inner planetary gear 52 centred on the axis 3 and joined in rotation to an end before the low-pressure shaft 11 of the turbojet engine, an outer planetary gear referred to as an outer ring gear 54, corresponding to the output element of the reducing gear joined in rotation to the fan hub 17, and a fixed planetary carrier 58 supporting an annular row of satellites 56 arranged between the planetary gears 52, 54. Of course other configurations for the reducing gear are possible, in particular with a rotating planetary carrier corresponding to the output element of the reducing gear, a rotating inner planetary gear, and an fixed outer ring gear.

In normal conditions of functioning of the turbojet engine, the high-pressure shaft 13 rotates at a speed which is sufficiently high to drive the feed pump 30. As shown by the arrows of FIG. 2, lubricant thus circulates with a high flow and high pressure in the lubricant intake pipe 34, before being projected by means 36 onto the gearset of the reducing gear 20. Then, the lubricant flows by gravity to the bottom of the casing 38, is collected by the recovery line 40, then reinjected into the system. In particular, the high pressure of lubricant in the intake pipe 34 keeps the actuated valve 44 in an open position, which enables the escape of lubricant through the recovery line 40 fitted with this same valve. In these conditions, there is no accumulation of lubricant in the bottom of the casing 38, as the lubricant can escapee freely through the line 40.

However, when the turbojet engine is shut down, or the aircraft is in flight or on the ground, the fan is in autorotation due to the blowing wind traversing the fan blades. On the ground, the wind can blow from the rear towards the front of the aircraft, in which case the fan can be driven in a reverse direction of rotation relative to the normal direction. The rotation of the fan, whether in normal direction or reverse direction, causes the constituent elements of the reducing gear 20 to rotate which need to be lubricated sufficiently, in particular the teeth of the pinions. This lubrication can no longer be adequately provided by the feed pump 30, since the high-pressure shaft 13 which drives it no longer rotates at a sufficiently high speed. However, as illustrated by the arrows in FIG. 3, lubricant is equally supplied at low pressure and low flow into the casing 26 via the intake pipe 34, without necessarily reaching the gearset of the reducing gear 20.

The invention provides that in such conditions of autorotation of the fan, the actuated valve 44 closes due to the low pressure of lubricant in the intake pipe 34. By closing, the valve 44 blocks the recovery line 40 and therefore the bottom of the casing 38. Due to the fact that the feed pump 30 is still driven by the high-pressure shaft 13 which rotates at low speed during an autorotation of the fan in flight, the bottom of the casing 38 fill up to the overflow outlet 50. The excess lubricant is then evacuated via the discharge line 48 to be redirected into the system via the recovery line 40, downstream of the valve 44.

Furthermore, in case of front or rear wind on the ground when the engine is shut down, the feed pump 30 is no longer driven since the high-pressure shaft 13 is generally no longer turning, but lubricant has accumulated at the bottom of the casing 38 following the closure of the valve 44 as a result of the drop in pressure of lubricant in the intake pipe 34 when the engine is shut down.

The low pressure threshold of lubricant from which the valve 44 closes is predefined such that when the turbine engine is shut down the closure of the valve 44 is performed sufficiently early before the rotation of the high-pressure shaft 13 stops to ensure an accumulation of lubricant in the bottom of the casing 38, due to the fact that the feed pump 30 turns with the shaft 13. In the case of an electric drive of the feed pump 30, the closure of the valve 44 when the turbine engine is shut down is capable of being performed sufficiently early before the feed of the electric motor of the pump 30 is stopped, in order to ensure a sufficient accumulation of lubricant in the bottom of the casing 38 to reach the level of the overflow outlet 50.

Figure 3:
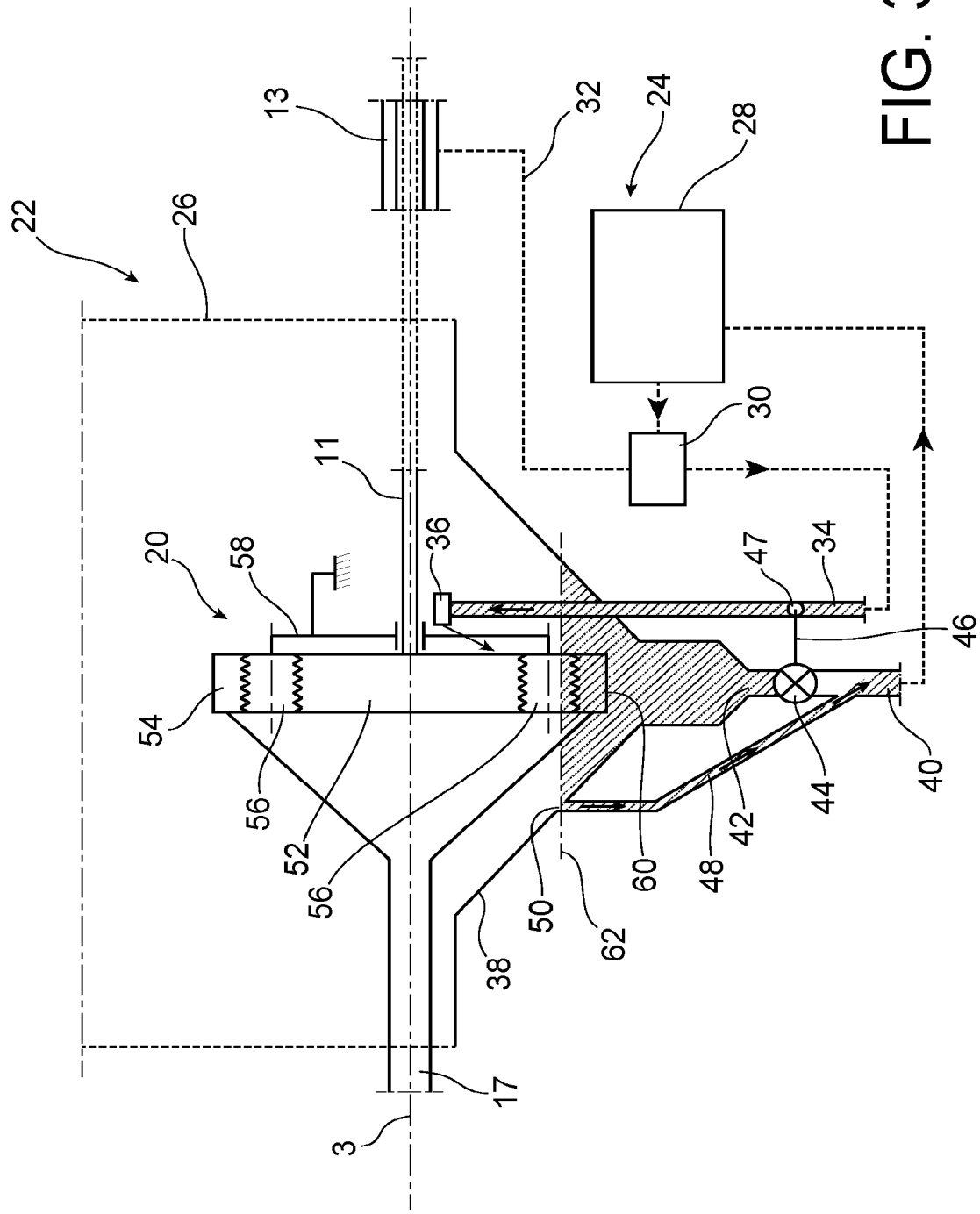
FIG. 3 shows a similar view to the preceding one, with the shown assembly in a state adopted in case of autorotation of the fan of the turbojet engine.

The overflow outlet 50 is arranged so as to immerse the reducing gear 20 in the accumulated lubricant, and preferably to immerse only the lower part of this reducing gear. More precisely, the outlet 50 is located above the horizontal level of a low point 60 of the gearset of the reducing gear, and below the horizontal level of the inner planetary gear 52 in order that the latter is not immersed in the volume of lubricant accumulated at the bottom of the casing 26. In a preferred manner, the overflow outlet 50 is located in an imaginary horizontal plane 62 traversing the annular row of satellite gears 56. Even more preferably, the imaginary horizontal plane 62 is located above the low point 60 of the gearset of the reducing gear even when the aircraft in flight is inclined in longitudinal and/or transverse direction at an angle of inclination corresponding to the maximum inclination authorised for the aircraft in conditions of autorotation of the fan. In this manner, the gearset continued to be lubricated in all "attitudes" of flight authorised for the aircraft when "windmilling", in particular when turning at an angle or descending. Even more preferably, the plane 62 is lower than the axis of rotation of the satellite gears concerned in their lowest position between the planetary gears 52, 54, as illustrated in FIG. 3.

In this configuration, the lower part of the ring gear 54 is immersed in the volume of lubricant that has accumulated at the bottom of the casing 26, and by rotating this ring gear brings with it the lubricant which can then be dispersed over the teeth of all the satellite gears 56.

Of course, various modifications can be made by a person skilled in the art, which have just been described, only as non-limiting examples and the scope of which is delimited by the accompanying claims.

The invention claimed is:

1. An assembly comprising a fan drive reducing gear for an aircraft turbine engine, as well as a lubrication system comprising:
   casing enclosing the reducing gear;
   means for projecting lubricant onto the reducing gear;
   a lubricant intake pipe intended to conduct the lubricant towards the projection means;
   a lubricant recovery line communicating with a bottom of the casing, wherein the lubrication system also includes an actuated valve fitted to the lubricant recovery line, as well as a lubricant overflow discharge line connected to an overflow outlet at the bottom of the casing located above a horizontal level of a low point of a gearset of the reducing gear, and to the lubricant recovery line, downstream of the actuated valve
   wherein the actuated valve is a slide valve connected to a moving part subjected to the pressure of a lubricant circulating in the lubricant intake pipe, the moving part acting against an action of a preloaded spring as a function of a threshold lubricant pressure below which the actuated valve is set to close completely.

2. The assembly according to claim 1, wherein the actuated valve is controlled by the pressure of lubricant circulating in the lubricant intake pipe, such that the lower the pressure of the lubricant the greater the tendency of the valve to close.

3. The assembly according to claim 1, wherein the drive reducing gear includes a planetary gear set comprising an inner planetary gear, an outer ring gear, as well as an annular row of satellites arranged between the inner planetary gear and the outer ring gear.

4. The assembly according to claim 3, wherein the overflow outlet of the bottom casing is located below a horizontal level of the inner planetary gear.

5. The assembly according to claim 4, wherein the overflow outlet at the bottom of the casing is located in an imaginary horizontal plane traversing the annular row of satellites.

6. A turbine engine of an aircraft comprising the assembly according to claim 1, the turbine engine including a fan driven by the reducing gear of the assembly.

7. The turbine engine according to claim 6, wherein the turbine engine is a dual-flow and dual body turbojet engine.

8. The turbine engine according to claim 6 wherein the lubrication system includes a feed pump configured to supply the lubricant intake pipe with the lubricant, and the turbine engine includes an engine shaft mechanically driving the feed pump.

9. A method for controlling the assembly according to claim 1, wherein in the case of autorotation of the fan it comprises a step of closing the actuated valve fitted to the lubrication recovery line, so that the bottom of the casing is filled with lubricant up to the overflow outlet.

\* \* \* \* \*